C. E. HECOX.
HOSE CLAMP.
APPLICATION FILED JUNE 1, 1916.
1,233,054.
Patented July 10, 1917.
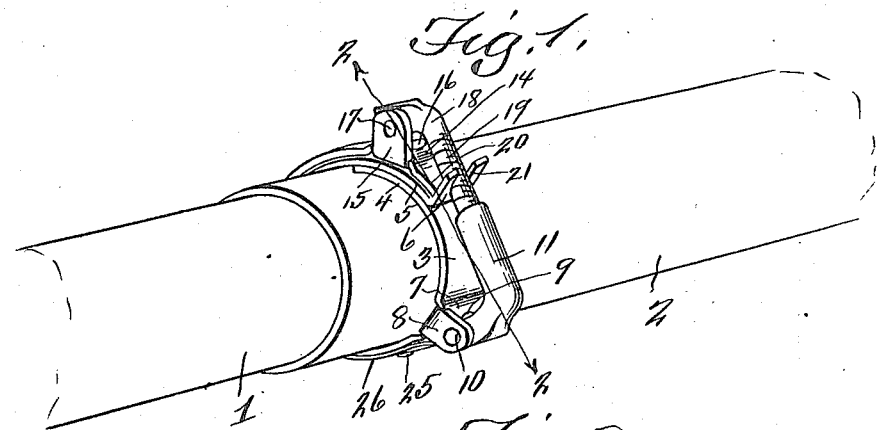
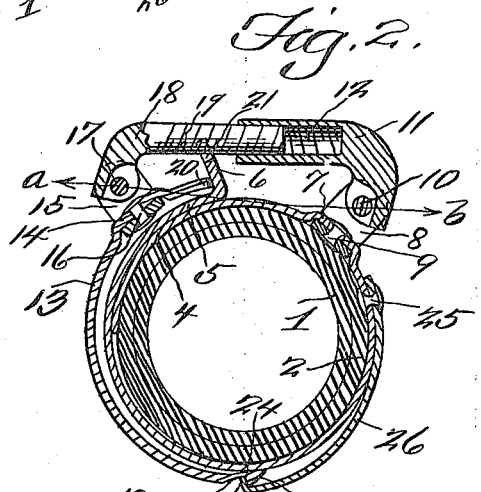
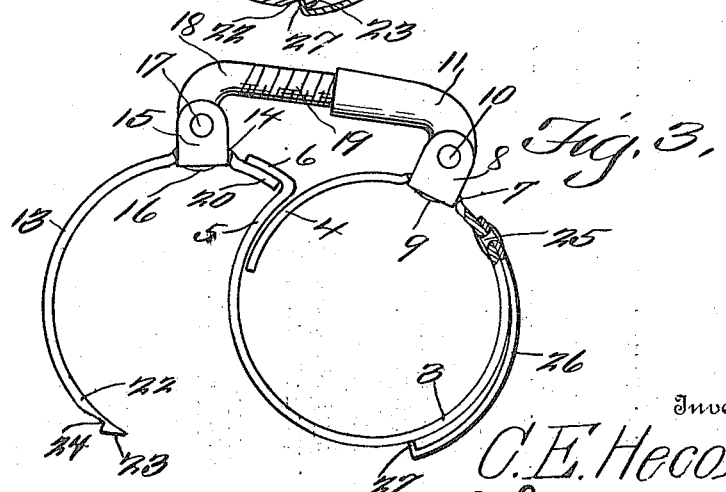
Witnesses
Inventor
C. E. Hecox.
By
Attorneys

UNITED STATES PATENT OFFICE.

CHARLES E. HECOX, OF ONTONAGON, MICHIGAN.

HOSE-CLAMP.

1,233,054.
Specification of Letters Patent.
Patented July 10, 1917.

Application filed June 1, 1916. Serial No. 101,083.

*To all whom it may concern:*

Be it known that I, CHARLES E. HECOX, a citizen of the United States, residing at Ontonagon, in the county of Ontonagon, State of Michigan, have invented a new and useful Hose-Clamp; and I do hereby declare the following to be a full, clear, and exact description of the invention, such as will enable others skilled in the art to which it appertains to make and use the same.

This invention relates to the art of couplings and joints, and particularly to an improved hose clamp, and more especially to an improved automatic safety catch for the lever of the hose clamp, to prevent it from being accidentally opened, when the clamp is in use, and which safety catch has been found very essential, desirable and practical, especially on steam and fire hose.

In practical fields the details of construction, may necessitate alterations falling within the scope of what is claimed.

The invention comprises further features and combination of parts, as hereinafter set forth, shown in the drawings and claimed.

In the drawings:—

Figure 1 is a view in perspective of a section of a hose, showing the improved clamp as applied thereto, to insure a secured joint.

Fig. 2 is a sectional view on line 2—2 of Fig. 1, showing the clamp locked.

Fig. 3 is a view in elevation of the clamp showing the parts open.

Referring more especially to the drawings 1 and 2 designates two sections of the hose and 3 denotes the clamping band of the hose clamp. The free portions 4 and 5 of the band 3 overlap each other, and the part 5 is provided with an ear 6 extending laterally. The band 3 is provided with an off set portion 7, in the under surface of which a U-shaped member 8 is riveted as shown at 9. A pivot pin 10 is mounted in the ears of the U-shaped member 8, and pivotally mounted upon the pin is an angular arm 11, the greater portion of which is hollow and is provided with internal threads 12. A curved locking clamp 13 is provided, and arranged or formed near one end thereof is an off set part 14, to which the U-shaped member 15 is riveted as at 16. A pivot pin 17 is mounted in the ears of the U-shaped member 15, and pivotally mounted on the pin 17 is an angular arm 18, the greater portion of which has threads 19, so as to engage the threads 12 of the hollow end of the arm 11. As shown in the drawings, the end portion 20 of the locking clamp 13 engages the ear 6 when the clamp is opened, but when the clamp is closed, that is the clamp 13, the edge of the portion 20 engages the ear 6. When the locking clamp is closed as shown in Fig. 2, the edge of the portion 20 engages the ear 6 at a point above the line *a—b*, hence the locking clamp under ordinary conditions will remain closed. The ear 6 has a recess 21 for the reception of the threaded portion of the arm 18, that is, when the clamp is closed. By virtue of the recess or bifurcation receiving the arm 18, the connecting arms 11 and 18 are guided into position, as the curved locking clamp approaches its closed position, thereby preventing lateral distortion or displacement of the clamping band 3. It is to be seen that the portion 20 may be disengaged from the ear 6, and the clamp 13 thrown to one side, whereby the arm 18 may be adjusted into and out of the arm 11, whereby the size of the clamp can be increased or decreased, to fit different size hose. The end portion 22 of the locking clamp terminates in a bevel extremity 23 and an adjoining notch 24. Secured to the band 3 by means of a rivet 25 is a spring catch 26 having a right angle extremity 27, which, when the locking clamp is closed, slides over the inclined or beveled portion 23, and engages the notch 24, thereby preventing the locking clamp 13 from opening, particularly when the hose clamp is used upon steam and fire hose or the like. This improved automatic safety catch is adapted for use as an essential improvement, for use in connection with the hose clamp, set forth, claimed and illustrated in the U. S. Patent 386,882, issued to C. E. Hecox, July 31, 1888. To open the locking clamp 13, the angled end portion 27 of said spring catch is pulled outwardly, so that the clamp 13 may be swung to an open position as shown in Fig. 3.

The invention having been set forth what is claimed as new and useful is:—

1. In a hose clamp, a yieldable clamping band having overlapping ends, the outer lapping end having a laterally extending ear, a curved locking clamp adapted to fulcrum against said ear when closing the locking clamp, a spring catch strip secured to the clamping band, and having a latch connection with said locking clamp, an adjustable connection connecting the yieldable band and the curved locking clamp, whereby the hose clamping device may be made to fit different sized hose, said adjustable connection comprising screw threaded parts, said ear having a bifurcation to receive one of said screw threaded parts, whereby said adjustable connections are guided into position when closing the locking clamp and preventing lateral distortion of the clamping band.

2. In a hose clamp, a yieldable clamping band having near one end an offset arch portion, the other end of the band having a lateral ear, a curved locking clamp, one end of which is adapted to fulcrum against said ear when closing the locking clamp, said locking clamp having an offset arch portion near its fulcruming end, U-shaped members engaging said offset arch portions and secured thereto, thereby insuring smooth and continuous surfaces for the band and the locking clamps, means consisting of threaded elements connecting said U-shaped members, and a spring catch secured to the clamping band and provided with a latching connection with the locking clamp.

3. In a hose clamp, a yieldable clamping band having an offset arch portion near one of its ends, and its other end terminating in a lateral ear, a curved locking clamp, one end of which adapted to fulcrum against said ear when closing the came, said locking clamp near its fulcruming end having an offset arch portion, U-shaped members engaging and being secured detachably in said offset arch portions, whereby the inner surfaces of the band and the locking clamp are rendered substantially smooth and unobstructed, adjustable screw threaded connected elements connecting said U-shaped members and disposed over the ear, said ear having a bifurcation to receive one of said screw threaded elements to guide said elements in position when closing the locking clamp and preventing lateral displacement of the band, a spring catch secured to said band and having a detachable latch connection with the locking clamp when closed.

In testimony whereof I have signed my name to this specification in the presence of two subscribing witnesses.

CHARLES E. HECOX.

Witnesses:
EDWARD CARROLL,
W. L. AUSTIN.